(12) United States Patent
Akiyama

(10) Patent No.: US 8,241,534 B2
(45) Date of Patent: Aug. 14, 2012

(54) SPECTACLE LENS MANUFACTURING METHOD AND SPECTACLE LENS MANUFACTURING SYSTEM

(75) Inventor: Hisanori Akiyama, Tokyo (JP)

(73) Assignee: Hoya Corporation, Tokyo (JP)

( * ) Notice: Subject to any disclaimer, the term of this patent is extended or adjusted under 35 U.S.C. 154(b) by 450 days.

(21) Appl. No.: 10/557,580

(22) PCT Filed: Mar. 9, 2005

(86) PCT No.: PCT/JP2005/004083
§ 371 (c)(1),
(2), (4) Date: Mar. 24, 2008

(87) PCT Pub. No.: WO2005/084885
PCT Pub. Date: Sep. 15, 2005

(65) Prior Publication Data
US 2006/0189255 A1 Aug. 24, 2006

(30) Foreign Application Priority Data
Mar. 9, 2004 (JP) .................................. 2004-066177

(51) Int. Cl.
*B29D 11/00* (2006.01)
(52) U.S. Cl. ............................................. 264/1.1; 451/5
(58) Field of Classification Search .................... 264/1.1
See application file for complete search history.

(56) References Cited

U.S. PATENT DOCUMENTS

| | | | | |
|---|---|---|---|---|
| 5,210,695 A | * | 5/1993 | Wood | 700/164 |
| 5,425,665 A | * | 6/1995 | Kennedy | 451/5 |
| 2002/0089642 A1 | | 7/2002 | Shirayanagi | |
| 2002/0160690 A1 | * | 10/2002 | Miyazawa et al. | 451/5 |
| 2003/0181133 A1 | * | 9/2003 | Siders et al. | 451/5 |

FOREIGN PATENT DOCUMENTS

| | | |
|---|---|---|
| EP | 1 080 835 A2 | 3/2001 |
| JP | B2-2982991 | 9/1999 |
| JP | A-2001-062689 | 3/2001 |
| JP | A-2002-46046 | 2/2002 |
| JP | A-2002-122823 | 4/2002 |
| JP | A-2002-160149 | 6/2002 |

OTHER PUBLICATIONS

Sep. 23, 2010 Supplemental European Search Report in European Application No. 05720355.6.

* cited by examiner

*Primary Examiner* — Matthew Daniels
*Assistant Examiner* — Jacob Thomas Minskey
(74) *Attorney, Agent, or Firm* — Oliff & Berridge, PLC

(57) ABSTRACT

To reduce the types of blanks such as a semi-finished lens blank, materials, and processing time, a spectacle lens design device disposed at a factory on a manufacturing side and a lens processing device connected thereto block an applicable semi-finished lens blank or lens blank. The semi-finished lens blank or lens blank are blocked so that a reference surface thereof tilts at a predetermined angle using a numerical-control curve generator. The reference surface tilts based on order information sent from an order terminal disposed at a spectacle store on a order-placement side. Both surfaces of a plastic material are formed so that a geometric center of an edge shape positions at a center of a circle of a circular lens thereby satisfy an optical specification of the spectacle lens-related to the order. Next, the circular lens is processed to have the edge shape of the spectacle lens-related to the order to thereby obtain the spectacle lens-related to the order.

5 Claims, 9 Drawing Sheets

FIG. 3

INQUIRY

| 10 | ORDER-PLACEMENT STORE (077801) SHIPPING DESTINATION (077801) | DELIVERY TYPE ( ) |
|---|---|---|
| 20 | D-ITEM ( ) TYPE (4) HELP | METS PROCESSING (3) UNSPECIFIED |

| 31 | LENS (NV3-H ) LENS L ( ) |
| 32 | : (NV3X-H ) : ( ) |

Sph  Cyl  Ax  Add       PROCESSING1  PROCESSING2  PROCESSING3  PROCESSING4

| 41 | R (-2.00)(-1.50)(120)(1.00) ( ) ( ) ( ) ( ) |
| 42 | L (-2.00)(-1.50)(45)(1.00) ( ) ( ) ( ) ( ) |

MAKER  PRODUCT NO   SIZE           COLOR TMP      EDGE  COLOR STREAM TYPE/1 /2

| 51 | FRAME (USER 010) ( - ) USERTEST  0000  METAL |
| 52 | : ( ) |

PD     NPD     SEG    ET    EP        BEVEL MODE        POSITION       SHAPE

| 61 | R (33.0) ( ) ( ) ( ) ( )  (4) AUTO   (0,0) ㎜ (0) MODEL |
| 62 | L (33.0) ( ) ( ) ( ) ( )  (4) AUTO   (0,0) ㎜ (0) MODEL |

| 70 | ( ) |
| 80 | REMARKS (HELP ) NAME (MR/MS HOYA ) |

CORRECTION / DELETION NO. ( )  (CORRECTION: NO. ■  DELETION / NO. ■ )

| LENS DIOPTER | CONVENTIONAL SEMI-FINISHED LENS BLANK | | | SEMI-FINISHED LENS BLANK OF OUTSIDE DIAMETER 65 mm | | | SEMI-FINISHED LENS BLANK OF OUTSIDE DIAMETER 55 mm | | |
|---|---|---|---|---|---|---|---|---|---|
| | OUTSIDE DIAMETER | THICKNESS | WEIGHT | OUTSIDE DIAMETER | THICKNESS | WEIGHT | OUTSIDE DIAMETER | THICKNESS | WEIGHT |
| −4 | 80 | 4 | 45.5 | 65 | 3.5 | 23.8 | 55 | 3.5 | 15.5 |
| −8 | 75 | 6.2 | 57.2 | 65 | 3.5 | 26.8 | 55 | 3.5 | 17 |
| 3 | 70 | 4 | 23.6 | 65 | 4 | 20 | 55 | 4 | 14.1 |
| 6 | 70 | 5.8 | 26.8 | 65 | 6 | 24.6 | 55 | 6 | 18.3 |

UNIT : OUTSIDE DIAMETER(mm), THICKNESS(mm), WEIGHT(g), LENS DIOPTER ( DIOPTER )

| LENS DIOPTER | CONVENTIONAL SEMI-FINISHED LENS BLANK | | | CONVENTIONAL COMPLETED PRODUCT (FINISHED PRODUCT) | | | SPECTACLE SET IN FRAME | | |
|---|---|---|---|---|---|---|---|---|---|
| | OUTSIDE DIAMETER | THICKNESS | WEIGHT | OUTSIDE DIAMETER | THICKNESS | WEIGHT | OUTSIDE DIAMETER | THICKNESS | WEIGHT |
| -4 | 80 | 4 | 45.5 | 80 | 1 | 21.8 | 47 | 1 | 4.2 |
| -8 | 75 | 6.2 | 57.2 | 75 | 1 | 30.9 | 47 | 1 | 6.2 |
| 3 | 70 | 4 | 23.6 | 70 | 3.1 | 10.3 | 47 | 3.1 | 6.2 |
| 6 | 70 | 5.8 | 26.8 | 70 | 5.3 | 15.9 | 47 | 5.3 | 10.4 |

UNIT: OUTSIDE DIAMETER(mm), THICKNESS(mm), WEIGHT(g), LENS DIOPTER( DIOPTER )

SPECTACLE LENS MANUFACTURING METHOD AND SPECTACLE LENS MANUFACTURING SYSTEM

TECHNICAL FIELD

The present invention relates to a spectacle lens manufacturing method and a spectacle lens manufacturing system manufacturing a spectacle lens based on order information including spectacle frame information, a prescription value, and layout information.

BACKGROUND ART

Generally, a spectacle lens is manufactured by a manufacturing side such as a lens maker based on order information obtained from an order-placement side such as a spectacle store, and provided to the order-placement side. In this case, there are two types for the lenses provided by the manufacturing side, namely one requiring an edging at the spectacle store and the others finished to be settable as it is to a frame without the need for the edging at the spectacle store. In the former case, the lens provided by the manufacturing side has optical surfaces of a curved surface shape satisfying an optical specification such as a diopter and the like on both the surfaces, while the outer shape thereof is still be a circle. The spectacle store, therefore, needs to measure an edge shape of the frame with a frame shape measurement device and edges the circular lens with an edger based on the measurement data, layout information, and the like to make the lens be settable in the frame.

In this regard, the latter case requires the spectacle store to simply set the lens in the frame. Hence, in recent years, the use of the lenses of the latter case is expanding gradually. As an example of the system that has realized the provision of the latter lens, for example, there is one disclosed in Patent Document 1. In the system disclosed in Patent document 1, information necessary to manufacture a lens such as three-dimensional frame shape information is transmitted to a manufacturing-side computer via an order-placement side computer; based on the information, a circular lens having an optical surface of a curved surface shape satisfying a predetermined optical specification is obtained at the manufacturing side; further, the circular lens is edged so that the finished lens has a shape settable in the frame; and the finished lens is supplied to the order-placement side.

Meanwhile, in this manufacturing system, in the step manufacturing the circular lens having the optical surface satisfying the predetermined optical specification, a semi-finished lens blank being a circular plastic material having an appropriate curved surface having an optical surface having a surface shape already satisfying a predetermined optical specification on one side but has no such optical surface satisfying the predetermined optical surface on the other side, is used. In other words, many types of semi-finished lens blanks of which one surfaces satisfy a variety of optical specifications are prepared in advance, and a semi-finished lens blank having the optical surface satisfying the optical specification of an received order is selectively determined. Then, the other surface is processed with a curve generator or the like to form an optical surface of a predetermined surface shape, thereby the circular lens satisfying the predetermined optical specification is obtained.

Incidentally, to be more precise, the semi-finished lens blank is manufactured in the following manner. For instance, in the case of using a thermosetting resin material as a lens material, a molding method called a casting method is commonly employed, in which a casting mold is formed by two pieces of shaping dies having a predetermined curvature and a sealant (for example, gasket), and a lens material is injected thereinto to go through polymerizing, curing, and mold-releasing to be mold. At this time, the previously-described shaping die (upper die: the convex surface side of a product) is shaped to have a coverture forming an optical surface of a curved surface shape satisfying a prescription, and the surface therefore satisfies specification as a finished surface, so that a grinding and polishing is performed on the concave surface side so as to satisfy a prescribed diopter. This processing system making use of the semi-blank has an advantage in that the delivery time from the order receipt to the shipment can be reduced because the processing is required only for a single surface.

Further, in this manufacturing system, after the circular lens is obtained, it is required to edge the lens to finish the lens to be a spectacle lens of a shape settable to a frame to thereby provide to the order-placement side. The edging is performed in the following manner. Specifically, first, the position of the edge shape in the circular lens is defined to perform the edging. This position is inevitably defined when assuming a spectacle lens shape that satisfies the specification when set in the frame under conditions set by circular lens shape information, three-dimensional edge shape information, prescription information, and the like. An important point in this case is a circular center of the circular lens, specifically, a geometric center of the edge shape is arranged with a shift to the extent of a so-called eccentric quantity with respect to an optical center formed at the geometric center of the circle. This is conducted with an aim of matching the position of a spectacle lens that the line of sight passes through with the optical center of the lens when the spectacle lens is worn by a person. The position that the line of sight passes through generally shifts by a predetermined distance inward from the geometric center of the edge. This shifted quantity is generally called an eccentric quantity. Therefore, in order to define the edge in the circular lens, the definition is made by shifting the geometric center of the edge shape by an eccentric quantity with respect to the center of the circular lens.

[Patent document 1]
Japanese Patent Publication No. 2982991

DISCLOSURE OF THE INVENTION

It is found that the above-described conventional spectacle lens manufacturing system has problems as below. Specifically, the above-described spectacle lens manufacturing system is capable of reducing a delivery time from an order receipt to a shipment with the use of a semi-finished lens blank when manufacturing a circular lens, since the processing is required only for a single surface. Meanwhile, however, this system has a problem that a great number of semi-finished lens blanks should be in stock. In other words, especially in recent years, a combination of a convex surface and concave surface is based on a lens design considering an optical aberration in order to satisfy a predetermined optical performance, resulting in a need to prepare many semi-finished lens blanks as inventories, which are classified into many types of lens curves and lens thicknesses on the convex surface side. In addition, in order to correspond to various types of flame shapes (edge shapes), additional inventories of different lens diameters are required. Moreover, the lens materials having different optical performance such as refractive indexes, Abbe numbers, or the like are increasing, so that the types of the semi-finished lens blank are forced to increase in proportion thereto.

Further, in the above-described conventional manufacturing system, when defining the edge in the circular lens to edge the circular lens, the definition is made by shifting the geometric center by a distance of the eccentric quantity from the center of the circular lens. This has been considered to be theoretically unavoidable as long as the eccentric quantity exists. However, the shift of the geometric center of the edge shape by the eccentric quantity with respect to the center of the circular lens causes a problem as below. Specifically, the outside diameter of the circular lens for a certain edge shape needs to be quite large as compared to the maximum outside diameter of the edge shape. Consequently, many materials forming the circular lens end to be disposed as swarfs. Besides, since a surface shape forming process was also performed to the portion removed by being cut and grinded, it indicates that the surface form forming process for most of the portion is primarily needless.

FIG. 12 is a table showing a relation between a conventional semi-finished lens and an eyeglass after set in a frame. In the table, for example, in the case of a typical example of a diopter of S-4.00 D and assuming a general frame, the ratio of the spectacle actually used as a spectacle is approximately 20% by weight, resulting in a disposal of the remaining approximately 80%.

The present invention has been made on the basis of the above-described background, and an object thereof is to provide a spectacle lens manufacturing method and a spectacle lens manufacturing system capable of reducing the number of types of blanks such as semi-finished lens blanks, materials, and processing time.

Means for Solving the Problems

As a means to bring a solution to the above-described problem, a first embodiment according to the present invention is a spectacle lens manufacturing method manufacturing a spectacle lens based on order information including spectacle frame information, a prescription value, and layout information, comprising the steps of: forming a lens member to obtain the lens member by forming a curved surface shape satisfying an optical specification of the spectacle lens related to an order on a plastic material; and edging to process the lens member to be shaped into an edge shape of the spectacle lens related to the order, in which the lens member forming step is to form a curved surface shape on the plastic material so that a geometric center of the edge shape positions at a processing center or geometric center of the plastic material.

A second embodiment is the spectacle lens manufacturing method, in which the lens member forming step uses a lens blank of which both the surface have not yet processed to the curved surface shape satisfying the optical specification of the spectacle lens related to the order but processed to a predetermined surface shape as a plastic material of a processing target, and is able to process the spectacle lens related to the order appropriately out of a plurality of lens blank prepared in advance, and in which the lens blank having an outside diameter at least larger than a maximum distance between a frame center and a frame of the spectacle frame related to the order and having the smallest outside diameter as well is selected and processed so that the spectacle lens related to the order is manufactured.

A third embodiment is the spectacle lens manufacturing method, in which the lens member forming step uses a numerical-control curve generator generating the curved surface shape of a processing target by controlling distances from a cutting blade to the plastic material and a rotation axis, respectively, in accordance with the curved surface shape of a formation target while rotating the plastic material around the rotation axis passing through a specific point of the curved surface of the processing target, and in which the plastic material is arranged so that the center thereof being a geometric center of an edge shape of the spectacle lens comes on the rotation axis, a calculation is made to obtain a tilt angle in a case where a reference surface of the plastic material is tilted at a predetermined angle with respect to a case where the processing is performed on assumption that an optical center or a lens vertex positions on the rotation axis, and a processing is performed by tilting the reference surface of the plastic material beforehand to offset the tilted angle.

A fourth embodiment is a spectacle lens manufacturing system, comprising: an order-placement side computer processing and transmitting information required to order a spectacle lens including frame shape information; a manufacturing-side computer acquiring information required to manufacture the spectacle lens-related to the order by receiving the information transmitted by the order placement-side-computer; and a spectacle lens manufacturing device manufacturing the spectacle lens-related to the order that is processed to have a shape settable in a frame by performing processes including formations of a curved surface and edge shape on a plastic material based on the information acquired by the manufacturing computer, in which the spectacle lens manufacturing device uses, as the plastic material of a processing target, a lens blank being a partly finished product of which both surfaces are not yet processed to have a curved surface satisfying an ultimate optical specification but have a predetermined surface shape, in which a processing center of the lens blank matches with a frame center of the edge shape to be processed, in which the spectacle lens manufacturing device selects, out of plural lens blank of different outside diameters and/or lens thicknesses prepared in advance, the lens blank having the outside diameter and/or lens thickness size(s) allowing an appropriate processing for the spectacle lens-related to the order, in which the selection of the outside diameter of the lens blank is conducted by specifying based on a distance from a frame center to a frame and the spectacle lens-related to the order is manufactured by processing the selected lens blank, and in which the curved surface formation is performed to both the surfaces of the lens blank selected by the selection.

A fifth embodiment is a spectacle lens manufacturing method manufacturing a spectacle lens based on order information including spectacle frame information, prescription value, and the layout information, comprising the steps of: a lens member forming step obtaining a lens member by forming a curved surface shape satisfying an optical specification of the spectacle lens related to the order on a plastic material; and an edging step processing the lens member to be shaped into an edge shape of the spectacle lens related to the order, wherein the lens member-forming step is to form a curved surface shape on the plastic material so that a geometric center of the edge shape positions at a center of the plastic material.

A sixth embodiment is the spectacle lens manufacturing method according to the first embodiment, in which the lens member forming step uses, as a plastic material of a processing target, a semi-finished lens blank of which one surface is processed to have a curved surface shape satisfying an optical specification of the spectacle lens related to the order but the other surface is not processed to have the curved surface shape satisfying the optical specification of the spectacle lens related to the order, or a lens blank of which both the surfaces are not processed to have the curved surface shape satisfying the optical specification of the spectacle lens related to the order but processed to have a predetermined surface shape, and at the same time, the lens member forming step can process the spectacle lens related to the order appropriately out of a plurality of semi-finished lens blanks or lens blanks manufactured and prepared in advance, selecting the blanks of the smallest outside diameter and processing the selected semi-finished lens blank or lens blank to manufacture the spectacle lens related to the order.

A seventh embodiment is the spectacle lens manufacturing method according to the first or second means, in which the lens member forming step uses a numerical-control curve generator generating a curved surface shape of a processing target by controlling distances from a cutting blade to the plastic material and to the rotation axis, respectively, by a computer in accordance with the curbed surface shape of a formation target while rotating the plastic material around a rotation axis passing through a specific point of a curved surface of a processing target; arranges the plastic material so that the center thereof being a geometric center of the edge shape of the spectacle lens positions on rotation axis; calculates an tilt angle in the case where a reference surface of the plastic material is tilted at a predetermined angle on the back of the arrangement as compared with the case assuming that an optical center or a prism measurement point positions on the rotation axis; and processes by tilting the reference surface of the plastic material so that the tilt angle is offset beforehand.

An eighth embodiment is a spectacle lens manufacturing method manufacturing a spectacle lens based on order information including spectacle frame information, a prescription value, and layout information, comprising the steps of: a lens member forming step obtaining a lens member by forming a curved surface shape satisfying an optical specification of the spectacle lens related to the order on a plastic material; and an edging step processing the lens member to be shaped into an edge shape of the spectacle lens related to the order, in which the lens member forming step uses, as a plastic material of a processing target, a semi-finished lens blank of which one surface is processed to have a curved surface shape satisfying an optical specification of the spectacle lens related to the order but the other surface is not processed to have the curved surface shape satisfying the optical specification of the spectacle lens related to the order, or a lens blank of which both the surfaces are not processed to have the curved surface shape satisfying the optical specification of the spectacle lens related to the order but processed to have a predetermined surface shape, and at the same time, the lens member forming step can process the spectacle lens related to the order appropriately out of a plurality of semi-finished lens blanks or lens blanks manufactured and prepared in advance, selecting the blanks appropriate for the processing for the spectacle lens related to the order and processing the selected semi-finished lens blank or lens blank to manufacture the spectacle lens related to the order, and further, the plural semi-finished lens blanks manufactured and prepared in advance is those having a curved surface shape receiving a large number of orders based on a past actual order record while plural lens blank manufactured and prepared in advance are used to manufacture a lens having a curved surface shape receiving a small number of orders.

A ninth embodiment is a spectacle lens manufacturing system, comprising: an order placement-side computer processing and transmitting information required to order a spectacle lens including frame shape information; a manufacturing-side computer acquiring information required to manufacture the spectacle lens-related to the order by receiving the information transmitted by the order placement-side computer; and a spectacle lens manufacturing device manufacturing the spectacle lens-related to the order that is processed to have a shape settable in a frame by performing processes including formations of a curved surface and edge shape on a plastic material based on the information acquired by the manufacturing computer, in which the curved surface forming step uses, as a plastic material of a processing target, a semi-finished lens blank of which one surface is processed to have a curved surface shape satisfying an optical specification of the spectacle lens related to the order but the other surface is not processed to have the curved surface shape satisfying the optical specification of the spectacle lens related to the order, or a lens blank of which both the surfaces are not processed to have the curved surface shape satisfying the optical specification of the spectacle lens related to the order but processed to have a predetermined surface shape, and at the same time, the curved surface forming step can process the spectacle lens related to the order appropriately out of a plurality of semi-finished lens blanks or lens blanks manufactured and prepared in advance, selecting the blanks of the smallest outside diameter and/or the smallest lens thickness size(s) and processing the selected semi-finished lens blank or lens blank to manufacture the spectacle lens related to the order.

A tenth embodiment is a spectacle lens manufacturing system, comprising: an order placement-side computer processing and transmitting information required to order a spectacle lens including frame shape information; a manufacturing-side computer acquiring information required to manufacture the spectacle lens-related to the order by receiving the information transmitted by the order placement-side computer; and a spectacle lens manufacturing device manufacturing the spectacle lens-related to the order that is processed to have a shape settable in a frame by performing processes including formations of a curved surface and edge shape on a plastic material based on the information acquired by the manufacturing-side computer, in which the spectacle lens manufacturing device uses, as the plastic material of a processing target, a lens blank being a partly finished product of which both surfaces are not yet processed to have a curved surface satisfying an ultimate optical specification but have a predetermined surface shape, in which the spectacle lens manufacturing device selects, out of plural lens blank of different outside diameters and/or lens thicknesses manufactured and prepared in advance, the lens blank having the outside diameter and/or lens thickness size(s) allowing an appropriate processing for the spectacle lens-related to the order to process the selected lens blank to thereby manufacture the spectacle lens related to the order.

Effects of the Invention

One of embodiments according to the present invention is characterized in that a circular lens forming step is structured to form a curved surface shape on a plastic material in a manner that a geometric center of an edge shape positions at a center of the plastic material. This characteristic has a meaning as below. Specifically, conventionally, in the case where a lens member before processing of being shaped into the edge shape (an outer contour of this lens member is not necessary to be a circle) is, for example, a circular lens having substantially a circular outer contour, a curved surface shape is formed so that an optical center or a prism measurement point positions at the geometric center of the circle to thereby serve as an optical surface. This has been considered to be logically necessary for the convenience of a curve generator performing a conventional curved surface formation, and holding the lens when edging. To the contrary, one of the embodiments in the present invention is the one revoking such common practice. Specifically, first, it is conceived that the optical center or prism measurement point does not necessary position at the geometric center of the circle when the holding technique at the time of the processing is devised. Next, it is conceived that, when an attention is paid to the point that the processing is performed up to form the edge shape at the manufacturing side, there is no need to process the circular lens to form a curved surface shape in which the optical center or prism measurement point positions at the geometric center of the circle, and a processing to form a curved surface shape in which the geometric center of the edge matches with the geometric center of the circular lens has no problem. In other words, it is to form a circular lens in which the optical center or prism measurement point positions at a position different from the geometric center of the circle. With this, it becomes possible to define an edge shape in a circular lens having an outside diameter extremely close to the maximum outside diameter of the edge shape, allowing a substantial reduction in waste as compared to a conventional method. According to the other embodiment of the present invention, in order to correspond to various types of eccentric quantities, semi-finished lens blanks or lens blanks having optical centers different from their geometric centers are prepared in advance, so that a speedy manufacturing is enabled. Further, the processing to form a curved surface is performed to the lens blank as a start, requiring no shaping die of a high profile irregularity. According to still another embodiment of the present invention, the processing by a curve generator is allowed without changing conventional processing method largely.

Further more, according to still another embodiment, the types of lens blank to be prepared in advance can be reduced in number.

BEST MODE FOR CARRYING OUT THE INVENTION

Hereinafter, a spectacle lens manufacturing method and a spectacle lens manufacturing system according to an embodiment of the present invention will be described based on the drawings. Note that the spectacle lens manufacturing method related to the embodiment is used in the spectacle lens manufacturing system related to the embodiment, so that the description will be given by being included in the description of the spectacle lens manufacturing system. FIG. 1 is a view showing an entire configuration of the spectacle lens manufacturing system according to the embodiment. In this spectacle lens manufacturing system, an order terminal 101 and a spectacle lens design device 201 are connected via a network 300. The order terminal 101 is set at a spectacle store 100 as an orderer. The spectacle lens design device 201 is set at a factory 200 as a spectacle manufacturer side. At the factory 200 side, a lens processing device is connected to the spectacle lens design device 201 via a LAN 202, and the spectacle lens design device 201 and the lens processing device compose a spectacle lens manufacturing device.

Note that there is shown only one spectacle store 100 in the drawing as an orderer, however, in practical, two or more spectacle stores 2 are connected to the factory. Further, as an orderer, in addition to the spectacle stores, an eye clinic, an individual, and the like can be included. Furthermore, the network 300 may be Internet, the other public network, or a dedicated line such as WAN. Moreover, a relay station may be provided between the order terminal 101 and the spectacle lens design device 201.

The order terminal 101 is composed, for example, of a personal computer, and provided with a display unit, an input unit, a communication control unit, and so forth. The display unit displays a guide screen supporting to input various types of data required to order a spectacle lens. The input unit is to input a prescription data and so forth of an examined eye. The communication control unit controls a data communication to the spectacle lens design device 201. Note that the input unit and display unit may compose a touch screen.

The spectacle lens design device 201 acquires prescription information and the like of the spectacle lens from the order terminal 101 to design the spectacle lens in accordance with the prescription. The spectacle lens design device 201 is provided with a memory unit, an arithmetic and control unit, a communication unit, and the like. In the memory unit, a design program, a processing data generating program, and the like are stored.

The design program has a function letting the computer to acquire the prescription information about a pair of right and left spectacle lenses, and a function to prepare a design data for the respective spectacle lenses based on the acquired prescription information. The processing data generating program has a function to realize the computer to generate a processing data required for a lens processing device to practically process the lens based on the design data prepared by the design program.

The arithmetic and control unit executes a designing and the like by executing the above-described design program and the like.

Further, the arithmetic and control unit generates processing data as control information of the lens processing device by executing the processing data generating program, and controls a transmission of the generated processing data to the lens processing device. The communication unit sends and receives the data between the order terminal 101 and the lens processing device under the control of the arithmetic and control unit.

The lens processing device actually manufactures the spectacle lens based on the processing data acquired from the spectacle lens design device 201 via the LAN 202. In FIG. 1, for the purpose of convenience, the lens processing devices is shown as a single block, however, the lens processing device can include a numerical-control lens grinding machine composed of a curve generator, a smoothing and polishing machine, a lens-meter, a thickness meter, and a machining center; a chuck interlocker; a bevel-vertex-shape measurement apparatus; and so forth.

(Order)

FIG. 2 is a flowchart explaining the spectacle lens manufacturing system according to the embodiment.

Hereinafter, a flow from an order to a delivery will be described with reference to the flowchart in FIG. 2. The spectacle lens manufacturing method according to the present invention is implemented in this flow. Firstly, in the spectacle store 100, in the display unit of the order terminal 101, there is shown an input screen. A sales assistant or the like inputs, in accordance with the guide of the input screen, spectacle lens specification information required to design the lens such as prescription data of the examined eyes of a customer, an edge shape data, or the like. Here, the specification information includes a bevel type, a bevel position, three-dimensional frame shape information, an antirefraction film type, a lens color type, an article number identifying the spectacle lens type, and the like. Further, the prescription data includes spherical refractive powers, cylindrical refractive powers, cylindrical axes, addition diopters, interpupil distances, unaided visual acuities, and the like of both the eyes of the customer. The inputted spectacle lens information, prescription value, spectacle frame information are transmitted online to the spectacle lens design device 201 in the factory 200 via the network 300. FIG. 3 is a view showing an example order entry screen of the order terminal.

(Calculation of Processing Data)

Based on the transmitted data, the spectacle lens design device 201 calculates the processing data used in the lens processing device and transmits the data to the respective processing devices via the LAN 202. Then, at the same time of the completion of the calculation, a processing instruction sheet including received order details and a processing directive is issued at the factory 200.

(Issuance of Processing Instruction)

The processing instruction sheet is prepared, as two pieces of sheets for a concave surface and convex surface. First, in response to the order from the spectacle store, the concave surface instruction sheet is automatically outputted at a site, and the convex surface instruction sheet is outputted in series. The processing instruction sheet includes the following details and is referred to if necessary in each manufacturing step.

(Processing Instruction Details)

The processing instruction sheet for the concave surface side includes spectacle prescription-related information, frame-related information, measurement-related information, and manufacturing-related information. The spectacle prescription-related information includes, for example, a prescribed average refractive power, a prescribed cylindrical refractive power, a prescribed cylindrical refractive power direction, a prescribed addition refractive power, a prescribed pupil distance, a prescribed prism, a progressive zone length, a type of addition diopter definition method (addition diopter definition for the convex surface, addition diopter definition for the concave surface, and addition diopter definition for wearing), an inset amount, and the like; and the frame-related information is composed of details including an edge shape, a frame center pupil distance (FPD), and the like. Further, the measurement-related information include, for example, a horizontal position of a distance portion measurement point, a vertical position of the distance portion measurement point, a horizontal position of a near portion measurement point, a vertical position of the near portion measurement point, an average refractive power of the distance portion of the processed surface, a distance portion cylindrical refractive power of the processed surface, a distance portion cylindrical axis of the processed surface, an average curvature of the processed surface, an average curvature in the cylindrical axis direction of the processed surface, an average refractive power of the near portion of the processed surface, an cylindrical refractive power of the near portion measurement section of the processed surface, a difference in average diopters of the distance portion and the near portion of the processed surface, a lens thickness, and the like.

The manufacturing-related information includes, for example, a product name, the name of a blank being a circular plastic material, a blank name curve, an outside diameter of the blank in use, a curve value of a fixture holding the blank surface, a fixture diameter, a block ring diameter, a fixture type, the height of the blank center from a reference surface of the fixture after being cut, the height of the blank center from the reference surface of the fixture before being cut, a balloon polishing type (the outside diameter and height of a balloon polishing tool), polishing conditions including polishing time and polishing pressure, a convex surface curvature of the unprocessed blank, a concave surface curvature of the unprocessed blank, a center thickness before processing, an order date, a registration number, a delivery date, and a one-dimensional bar-cord indicating a tray number. Note that, in the description below, the circular plastic material having a surface processed to have a curved shape that satisfies the optical specification of the spectacle lens and the other surface not processed enough to have a curved shape that satisfies the optical specification of the spectacle lens is referred to as a semi-finished lens blank, and a circular plastic material of which both the surfaces are processed to have a predetermined surface shape but have a curved surface satisfying the optical specification of the spectacle lens, respectively, is referred to as a lens blank, and both the above semi-finished lens blank and lens blank are collectively referred to simply as a blank. Note that, in the description above, the description was given for the case where the semi-finished lens blank and lens blank have a circular outside contour shape, respectively, however, the shape is not necessary be the circular shape and may be an oval and so on.

Further, there is a number given at a time of an order receipt for use in the manufacturing process (hereinafter also called a "tray number"), and a concave surface processing instruction sheet and a convex surface processing instruction sheet have the number with "9" and "0 (zero)", respectively, added to their numbers as the last digit. For instance, a received order is numbered "12345" as the tray number, its concave surface instruction sheet is numbered "123459", and its convex surface instruction sheet is numbered "123450". The issued processing instruction sheet is kept in the tray together with the blanks for reference in respective steps. The convex surface instruction sheet has the same contents as of the concave surface instruction sheet, but has a different number under the above-described numbering rule for the tray number.

(Selection of Lens Blank)

(Calculation of Required Blanks Outside Diameter)

FIG. 4 is an explanation view of a calculation method for calculating a required outside diameter of a blank. In FIG. 4, firstly, on a circular blank, a frame center 410 is matched with a geometric center 411 of the blanks. One of the outside diameters is selected for a blank 413, and a minimum outside diameter but covering the entire area of an edge shape 412 is calculated for the blank. In the above calculation method, the outside diameter of the blank is defined as the largest distance between a frame portion 416 and the frame center 410 (the geometric center of the edge shape). By comparison therewith, in the conventional case, as shown in FIG. 13, the geometric center 411 is arranged at a position shifted from the frame center 410 by an eccentric quantity.

(Steps of Selecting Blanks Outside Diameter)

Out of the blanks having calculated blanks outside diameters being set to be the largest distance between the frame center 410 and the frame portion 416 or over, one, having the smallest blank outside diameter is defined as a blank required and picked up for the use of the processing followed. FIG. 5 is a view showing a selection example of the blanks outside diameters as a table. As shown in FIG. 5, in the present embodiment, as blanks outside diameters, 55 mm and 65 mm are set. These sizes are set on the ground that the frame shape size is commonly 43 mm in A size and 52.9 mm in B size in a boxing system, and therefore, the diameter of a circle circumscribed around the frame and having the frame center as a center comes to 61.1 mm, so that the outside diameter of roughly plus or minus 5 mm with respect to the circle diameter is defined as the blanks outside diameters.

In the above case, the blank may be a blank with concave and convex surfaces both of which do not satisfy a desired design optical surface, or a blank having only one surface formed to be an optical surface. Specifically, the shape may be a column of a disk shape or a shape having any curve as long as the shape allows a blocking. Note that the surface of the blank other than the optical surface does not require such a higher accuracy in shape as well as surface property as of the optical surface. Further, the smallest center thickness of the blank is defined to be 3.5 mm in that the blank having a center thickness below 3.5 mm reveals a weakness in withstanding pressure in a cutting to be elastically deformed. Notwithstanding the above, when the deformation by the elastic deformation is of a negligible amount, the blanks having a thickness below 3.5 mm is suitable.

(Combined Usage of Semi-Finished Lens Blank and Lens Blank)

Additionally, in the present embodiment, as to the products having a variety types of semi-finished lens blank or have orders concentrated to partial refractive powers, it is determined to use the semi-finished lens blank and lens blank concurrently. Specifically, depending on the order frequency of each refractive power, semi-finished lens blank are prepared for those refractive lens receiving relatively a large number of orders, and lens blank are prepared to be processed for the others receiving relatively a small number of orders. This is a method in which the characteristics of the semi-finished lens blank and lens blank are combined. The semi-finished lens blank has a feature that the convex surface has a design lens shape, so that a product can be produced by polishing only the concave surface. Therefore, the method using the semi-finished lens blank has advantages of reducing the removed amount in the processing of the spectacle lens as well as the processing time, in addition to the reduction in the usage amount of materials. Meanwhile, in the case of the semi-finished lens blank, it is necessary to have a new semi-finished lens blank all the time as a stock, so that many types of semi-finish lens blanks are required to cover every refractive power types, leaving a problem.

On the other hand, the lens blank has no optical surface on any of its surfaces, so that no segmentation is required for the blank type in view of the shape of the convex optical surface. Accordingly, as compared to the semi-finished lens blank, the lens blank is applicable to many refractive power types. Hence, the use of the lens blank for the refractive power types receiving a small number of orders exploits a preferable characteristic in an applicable refractive power distribution, so that the lens blank can make up for a shortcoming of the semi-finished lens blank. In other words, according to the present embodiment, parts of the refractive power types receiving a large number of orders are effectively manufactured using the semi-finished lens blank, and the other refractive power types receiving a small number of orders are manufactured using the lens blank, so that the types of the semi-finished lens blank can be reduced dramatically.

In the present embodiment, the generation of a curved surface that forms the optical surface of the circular lens is performed using a numerical-control curve generator generating an intended curved surface shape by controlling the distances from a cutting blade to a plastic material and from the cutting blade to a rotating shaft, respectively, in accordance with the curved surface shape of a formation target, while rotating a circular plastic material around the rotating shaft passing through a specific point of the curved surface of a processing target. Specifically, the curve generator processes by rotating the blanks around the geometric center so that a diamond blade edge of the blade traces the optical surface shape from the outer periphery of the blanks to the center thereof in a spiral manner without rotating the cutting blade.

In the present embodiment, a numerical-control curve generator is employed. FIG. 6 is a schematic view showing the curve generator. As shown in FIG. 6, when cutting a lens material A, a polycrystalline diamond or natural monocrystalline diamond, which is sintered is used as a cutting tool (turning tool). A lens is mounted on a lower shaft C side, and the cutting is performed under the controls by a total of three shafts, in which the lower shaft C rotates without moving, and the turning tool of an upper shaft D controls two shafts radially from the lens outer periphery and vertically. In the curve generator, the lower shaft C has one shaft and the upper shaft D has two shafts, specifically a first upper shaft section G on which a first turning tool F for a rough cut is mounted, and a second upper shaft section I on which a second turning tool H for a finishing cut is mounted, where the upper shaft D is structured to slide with respect to the lower shaft C to thereby switch the first and second upper shaft sections G, I. For generating a convex optical surface, a transfer of a design shape and height data of the convex surface to a numerical control section causes the processing automatically. The machining accuracies of the curve generators is 3 μm or below (lens diameter is 50 mm) and the maximum surface roughness Ry is approximately 0.3 to 0.5 μm.

Here, conventionally, the design shape and height data is generally arranged so that an optical center or a prism measurement point (hereinafter also referred to as a "design shape center") matches with the processing center of the lens blank. However, in the present embodiment, the arrangement is performed so that the processing center of the lens blank matches with the frame center instead of the design shape center. Therefore, in the present embodiment, first, the position of the frame center in the design shape height data is specified. For the specification, first, an inward eccentric quantity is calculated based on a prescription pupil distance being spectacle prescription-related information and a frame center distance being frame-related information. Then, the position at an ear side from the design shape center and corresponding to the inward eccentric quantity is defined as the frame center position. Generally, the frame center frequently positions at the ear side from the design shape center, whereas the frame center may position at a nose side from the design shape center. Then, the processing data in which the specified frame center position of the design shape data is defined as the processing center is transmitted to the curve generator for processing.

(Blocking Device)

The processing with the above-described curve generator is performed such that a lens holder 7 is mounted on the convex surface of the blank first, and then the blank is mounted on the curve generator via the lens holder 7. After the concave surface of the blank is cut into a predetermined shape, the blank is mounted on a polishing device via the same lens holder 7 for the cut surface to be polished. In order to mount the blank on the lens holder, a protective film is made to adhere to the concave surface of the blank beforehand, and the above-described lens holder is mounted thereon by a blocker.

The above-described lens holder is composed of a fixture formed by a tool steel or the like, and an adhesive existing between the fixture and the convex surface of the blank. As the adhesive, generally, a low-melting alloy (hereinafter referred to as an alloy, for example, the alloy made of Bi, Pd, Sn, Cd, or In and having a melting point of 47° C. is employed). In order to fix the blank and the fixture via the alloy, first, the fixture is fitted to a recessed portion of a mounting table of a layout blocker first. Further, a blocking ring is placed on the upper surface of the mounting table so that the blocking ring surrounds the outer periphery of the fixture to thereby be positioned with a positioning pin and be fixed by a fixing tool. Subsequently, the blank together with the protective film adhering thereto is placed on the blocking ring with the concave surface thereof being directed upward, and the melting alloy is filled into a space surrounded by the blank, fixture, blocking ring, and the upper surface of the mounting table to be solidified by being cooled. Note that various sizes of the fixture and blocking ring are employed in accordance with the shape, outside diameter, and curvature of the blank.

(Position of Blank Geometric Center)

FIG. 7 is a view explaining a blocking. In FIG. 7, when a geometric center 403 of a blank 401 matches with the optical center thereof, the blank 401 is fixed so that the geometric center 403 and a center 406 of a jig such as a fixture 402 matches with each other on the same axis. Accordingly, in that case, the geometric center 403 of the blank 401, a frame center, and the center 406 of the jig such as the fixture 402 are arranged on the same axis. Here, an optical center 404 matches with a vertex of the height of the concave surface side of a lens in the case of a single-vision refractive power lens. Meanwhile, in the case of a multifocal progressive-power lens, the optical center 404 or the lowest point of the lens matches with the prism measurement point. Accordingly, in the present invention, the optical center 404 represents the optical center of the single-vision refractive power lens or the prism measurement point of the multifocal progressive-power lens, unless otherwise specially stated herein.

(Blocking Method with Tilted Blank)

However, in the present embodiment, the geometric center of the blank does not match with the optical center. FIG. 8 is a view illustrating a blocking state in the case where the geometric center of the blank is different from the optical center. As shown in FIG. 8, according to the present embodiment, differently from the conventional block (FIG. 7), the optical center 404 does not match with the rotational axis 403 of a processing machine, so that, on the geometric center 403, a normal direction 407 of a surface to be processed does not match with the direction of a rotational processing axis 406 to consequently cause a back cut. In other words, generally, for the mechanical structure of the above-described curve generator, it is impossible to cut unless the normal direction of the surface to be processed is in parallel with the rotational axis near the processing rotation axis in terms of the shape of the processing data, since a backside of the cutting blade and the surface of the lens interfere with each other (this is also referred to as a "back cut").

FIG. 9 is an explanation view of the blocking in the present embodiment. As show in FIG. 9, the blank 401 is set so that the normal direction at the geometric center 403 of the lens surface to be processed becomes in parallel with the rotational axis 406 of the processing machine. In order to set so, first, a calculation is made to bring a difference of the geometric center 403 of the surface to be processed with respect to the normal direction based on a decentral amount. Based on the calculated decentral amount, the whole blank 401 is tilted so as to offset the difference with respect to the normal direction, and the normal direction at the geometric center 403 of the surface to be processed is made to be in parallel with the rotational processing axis 406. The decentral amount is obtained as described below. Specifically, a difference between a distance between the frame centers (hereinafter referred to as a "FPD") and an inter-pupil distance (hereinafter referred to as a "PD") is calculated based on the FDP and PD of the spectacle frame information transferred to a mainframe. The difference between the FPD and PD corresponds to the decentral amount of the optical center of the processed lens surface with respect to the frame center.

(Polishing of Convex Surface)

The blank that is cut by the curve generator is subject to a polishing in which the cut surface is polished by a polishing device. FIG. 10 is a view showing an entire configuration of the polishing device 1, and FIG. 11 is a view showing a polishing jig 9 of the polishing device 1. In FIG. 10, the spectacle lens polishing device 1 includes a device main body 2 placed on a floor face, an arm 4 disposed to the device main body 2 in a rotatable manner in the direction orthogonal to the drawing around a horizontal shaft 3 movable right and left in the drawing, a not-shown driving device reciprocating the arm 4 in the right and left direction and also rotating in the direction orthogonal to the drawing, a lens mounting section 6 provided to the arm 4 and holding a convex surface 5a of the blank via a lens holding body 7, a swing device 8 disposed to position under the lens mounting section 6 in the device main body 2 and swiveling around a vertical axis K driven by the not-shown driving device (does so passively but actively), and so forth. The spectacle lens polishing device 1 further includes the polishing jig 9 provided on the swing device 8 in an attachable and detachable manner, a polishing pad 10 mounted on the polishing jig 9 in an attachable and detachable manner, a hoisting and lowering device 11 hoisting and lowering the lens mounting section 6, and so forth. The spectacle lens polishing device 1 of this kind is in conventional wide use except that the polishing jig 9 has a new structure, and, for example, a commercially available general-purpose polishing device manufactured by LOH Opticservice Wetzlar GmbH (TORO series) is used here to polish a lens 5.

The swing device 8 is mounted on a horizontal rotating shaft 21 at a swing angle of a degrees (for example, five degrees) by being tilted so that the swing device 8 moves in a swiveling manner with the polishing jig 9 mounted on a top surface. The lens 5 that has been cut and with the lens holding body 7 is attached to the lens mounting section 6 of the arm 4 with the concave surface 5b of the lens 5 being directed downward. The polishing jig 9 is composed of a balloon member 25 shaped into a cup-shape by a natural rubber being an elastic material, a synthetic rubber or rubber-like resin with an opening at the rear side, a fixing tool 26 sealing the rear-side opening of the balloon member 25 to keep the inside airproof, and a valve 27 supplying compressed air into the inside of the balloon member 25.

The balloon member 25 is composed of a dome section 25A having substantially an oval shape in a front view with a flat or even convex curved top surface, a cylinder section of substantially an oval shape extended downwardly from the outer periphery of the dome section 25A in a unified manner, and an inward flange of a circular shape provided to the rear end of the cylinder section in an extended and unified manner. Further, a locking portion protruding upward is provided at the inside end of the inward flange. The locking portion temporarily secures the balloon member 25 and a later-described inside fixture by engaging with the inside fixture, facilitates the assembling of the polishing jig and prevents the balloon member 25 from disengaging from the fixture when an outside fixture is mounted, and ensures to seal the inside. As a material of the balloon member 25, for example, a synthetic rubber (for example, IIR) of a hardness number 20 to 50 (JIS K 6253 TYPE A, hereinafter referred to as "JIS-A") having approximate property of a natural rubber or the natural rubber is used. A thickness T of the balloon is equal and approximately from 0.5 mm to 2 mm (generally, equal thickness of approximately 1 mm). It is preferable to prepare plural sizes of balloon members in accordance with the sizes of the blank to polish and/or the shapes of the surface to polish.

In the spectacle lens polishing device 1 of such a structure, the lens 5 is attached to the lens mounting section 6 of the arm 4 via the lens holding body 7, the polishing jig 9 with the polishing pad 10 mounted thereon is mounted on the upper surface of the swing device 8, and the blank is lowered by the hoisting and lowering device 11 so that the concave surface 5b is pushed onto the surface of the polishing pad 10. In this state, an abrasive is supplied onto the surface of the polishing pad 10 and, at the same time, the swing device 8 is made to swivel while the arm 4 is reciprocated right and left as well as back and forth. By these movements, the concave surface 5b (see FIG. 10) of the lens 5 is polished by the polishing pad 10 together with the abrasive by a trackless polishing trace, in which the polished trace shifts for every lap, so that the surface is finished to be a toric surface. The polish allowance is approximately 5 μm to 9 μm. As an abrasive, that of a solution type being a polishing solution having a polishing agent such as aluminum oxide, diamond powders, or the like (abrasive grains) dispersed therein is used.

(Marking)

A reference position is marked to the blank with the convex surface being polished. The marking is performed by a CO2 laser. The marking is conducted based on a reference surface of the fixture as a reference. A focusing lens composing a part of a laser irradiating device faces to a plastic lens being a marking object. The plastic lens is composed only of a lens base material. The laser marking method is that converges a diverging laser light or parallel laser light L on a point P on the surface of the lens base material or in the vicinity of the surface to thereby destruct the surface of the lens base material or the vicinity of the surface by melting, changing properties, or so forth using the energy of the converged laser light L to thereby make the destructed part function as a mark. Specifically, the part that is melted, changed in view of property, or so forth comes to have different refractive index, transmittance, and so forth from those of the other part, so that the part is identifiable from outside and functions as a mark.

The configuration conducting the laser making represents a configuration of a system giving a mark to the plastic lens being a marking object. The laser marking system is composed of a laser irradiation device and a lens holding device. The laser irradiation device is consisted of following components that are provided in the order of the traveling direction of the laser light; a laser generating section generating a pulsed laser light, a refractive mirror adjusting an optical path and light intensity of the laser light generated by the laser generating section, a condenser lens being a optical system to condense or diverge the laser light, a stencil (hereinafter referred to as a mask section) with a graphic-pattern space section formed to select and transmit the laser light diverged by the condenser lens as a graphic pattern, three pieces of optical path length adjusting mirrors composing an optical path adjustment section adjusting an optical path length or the like of the transmitted light from the mask section, and the above-described focusing lens condensing the transmitted light from the optical path adjustment section onto the point P in the vicinity of the surface of the plastic lens being the marking object.

(Removing Holding Member)

The blank of which convex surface is completed the polishing and has the mark is soaked into a warm water at a temperature of approximately 70 degrees by which the low-melting alloyed metal is melted and the holding member is removed from the semi-blank. The block layouts the reference position on the semi-finished lens blank marked by the above-described marking in accordance with a reference line of a block ring of the blocker.

(Cutting of Concave Surface and Polishing of Concave Surface)

The cutting of concave surface is the same as of the cutting of the convex surface except the design shape data being different from each other, and the cutting of the concave surface is performed by changing the convex surface cut data to that for cutting the convex surface. The polishing of the concave surface is also the same so that the description thereof will be omitted herein.

(Washing and Test)

When the polishing of the blank by the polishing device 1 is completed, the blank is removed from the polishing device 1 to be washed so that a foreign matter adhered to the lens surface is removed. Then, an appearing inspection by a visual check, a diopter test by a lens meter, a projection test of an inner surface of the lens by a transmitted light of a zircon lamp, and an optical performance test of an astigmatism are performed.

(Dyecrete Process)

A disperse dye (color index disperse orange) 5 g (0.5 Wt %), a surface-active agent 2 g, and a benzophenone-type ultraviolet absorbent 5 g are added into a liter of water, the stain solution is adjusted, and the lens is dyed at a temperature of 90° C. for 30 minutes, as a result, a dyed lens dyed brown at a density of 15% with an ultraviolet protective function is produced.

(Adjustment of Hard-Coat Coating Solution and Formation of Hard Coat)

Into a glass container provided with a stirrer, 142 parts of γ-glycidoxypropyltrimethoxysilane by weight is added, and 1.4 parts of 0.01 normal hydrochloric acid by weight and 32 parts of water by weight are dropped down while stirring. After the drop, the stir is performed for 24 hours, and a hydrolysate of γ-glycidoxypropyltrimethoxysilane is obtained. Subsequently, 460 parts of stannic oxide-zirconium oxide complex sol by weight (ethanol dispersion, metal oxide in total is 31.5 wt %, average particle diameter is 10 millimicron to 15 millimicron), 300 parts of etylcellosolve by weight, and further 0.7 part of silicon surface-active agent by weight as a slip additive, and 8 parts of aluminium-aluminium-acetonate by weight as a curing agent are added to the hydrolysate of γ-glycidoxypropyltrimethoxysilane, and after a sufficient stir and a filtration, a coating solution (refractive index: 1.59) is produced. Note that, here, the refractive index of the coating solution is adjusted to prevent an interference fringe from arising in a hard-coat layer. A calculation is made to curb the difference between refractive indexes between actual coat and estimated coat to 0.03 or below to correspond to the refractive index of the base material. The dyed-lens is dipped into an aqueous alkaline solution, washed sufficiently, dipped into the coating solution, and coated by a dipping technique (at a pull-up speed of 14 cm/minute). After the coating, the plastic lens is heated at a temperature of 130° C. for two hours, and a dyed plastic lens layer having a hard coat formed by an organic silicon coat is brought about.

(Formation of Multilayer Antireflection Film (Oxide Coat Layer))

As described above, after the hard coat formed by the organic silicon coat layer is coated on the plastic lens, first, a first layer (refractive index: 1.47, film thickness: $3/2\lambda$ ($\lambda$=550 nm)) formed by silicon dioxide coat layer is formed by a vacuum deposition method (degree of vacuum: $2\times10^{-5}$ Torr) directly. Subsequently, on the first layer, a second layer (refractive index: 1.80, film thickness $\lambda/4$) formed by two equivalent layers of zirconium oxide and silicon dioxide is formed by the vacuum deposition technique (degree of vacuum: $2 \times 10^{-5}$ Torr). Subsequently, an oxygen ion beam is irradiated to the plastic lens while the lens is heated to thereby evaporate titan dioxide, and thereafter, by depositing the evaporated titan dioxide on the second layer, a third layer (refractive index: 2.40, film thickness: $\lambda/2$) formed by titan dioxide layer is formed. In the formation of this third layer by the oxygen ion beam irradiation and vapor deposition technique, the heating temperature of the plastic lens is set at 77° C. Subsequently, on the third layer thus obtained, a fourth layer (refractive index: 1.47, film thickness: $\lambda/4$) formed by silicon dioxide is formed by the vacuum deposition technique (degree of vacuum: $2 \times 10^{-5}$ Torr), so that a lens having an antirefractive film being an oxide coat layer is obtained.

(Formation of Water Repellent Coat Film)

A fluorine compound represented by $C_3F_7$—$(OCF_2CF_7CF_2)_{24}$—$O(CF2)_2$—$[CH_2CH(Si—(OCH_3)_3)]_{1-10}$ is diluted with perfluoro hexane to that of 3% by weight, and used as a water repellent agent. A stainless sintered filter (mesh 80 micron to 100 micron, 18 f×3 mm) having 0.75 ml of the water repellent agent is set in a vacuum evaporator, and the surface of the outmost layer of the lens is heated at 520° C. The degree of vacuum in the evaporator is set to be $10^{-4}$ Toor. The film formation is performed to the plastic lens under the above-described conditions. As a result of the test, a contact angle with water was 110°. There was neither irregular interference color nor interference color change, exhibiting a favorable durability.

(Defogging)

Into a glass container with a stirrer, 200 parts of water by weight and 5 parts of polyacrylic acid (MW. 2000) by weight are added to be melted by being stirred. As a diluent solvent, 50 parts of ethylene glycol by weight, and, as a surface-active agent, 0.5 part of sodium dodecylbenzenesulfonate by weight are added thereinto and a stirring is performed for an hour, so that a defogging composition is obtained.

Subsequently, by coating the composition by way of a spraying technique on the dyed plastic lens having the organic silicon coat layer, the plastic lens having the antirefractive film being the oxide coat layer, and the lens having the water repellent film, as well as on the lens surface with the antirefractive film formed thereon, an antifog lens is obtained. Each of obtained plastic lenses exhibits a favorable defogging performance, having no irregular interference color or interference color change. Then, a final shipping test is conducted, a secret mark is marked by a $CO_2$ laser, and each lens is moved to a lens edging step.

(Blocking of Lens Before Edging)

Based on the calculation result from the received order data, a lens-holding blocking jig is fixed at a predetermined position by a terminal computer 230, a marker 231, an image processor 232, and the like in FIG. 1. Specifically, with the image processor 232, a picture of the surface of the spectacle lens is taken by a TV camera and displayed on a CRT screen, and a layout mark image of the lens before edging is displayed by overlapping thereon. Here, the position of the lens is determined so that the layout mark image displayed on the CRT screen matches with the three points of marks marked on the lens, and thereby the position that the blocking jig should be fixed is determined. A blocking position mark indicating the position to which the block jig should be fixed is painted on the lens by the marker 231. The block jig is fixed to the lens to match with the blocking position mark.

(Measurement of Lens Tilt in Blocked State)

The lens fixed to the blocking jig is fitted to a lens polishing device 241 in FIG. 1. In order to recognize the position (tilt) of the lens in the state fitted to the lens polishing device 241, the positions at predetermined three points at least of the surface or the rear surface of the lens are measured. The measured amount obtained here is recorded as a calculation data to be used in Step S22.

(Data Calculation for Bevel Edging)

A main frame 201 in FIG. 1 performs a bevel edging design calculation. Note that the actual bevel edging may cause a difference between the calculated lens position and the actual lens position, thereby the difference is corrected at the time when a coordinate transformation to an edging-coordinate is completed. Specifically, based on the measurement values of the three points, the difference between the calculated lens position and the actual position is corrected, and thereby an ultimate three-dimensional tip shape of the fixture is calculated.

(NC-Edging of Fixture)

Based on the calculated three-dimensional tip shape of the bevel, a calculation is made to obtain a three-dimensional processing locus data on a processing coordinate when polishing with a grindstone of a predetermined radius. The calculated processing locus data is transmitted to the numerical-controlled lens polishing device 241 via a terminal computer 240. The lens polishing device 241, which has a rotating grindstone for polishing so as to edge or bevel edge the lens under the control to move in the y-axis direction (vertically with respect to a spindle-axis direction) and being a numerical-control polishing device capable of controlling at least three axes including additionally the control of the rotation angle of the blocking jig for fixing the lens (in the rotating direction of the spindle) and the control of the z-axis controlling the grindstone or the lens to move in the z-axis direction (spindle direction) to bevel edge, performs the edging and bevel edging of the lens in accordance with the transmitted data. Note that the lens polishing device 241 polishes with the grindstone, however, a cutting device with a cutter to perform a cutting may be employed instead.

(Measurement Test of Bevel Top Peripheral Length)

With the use of a terminal computer 250 and a shape measurement apparatus 251 measuring a bevel top, the peripheral length and shape of the bevel top of the lens before bevel edging is measured. Specifically, the lens completed the processing in Step S23 is removed in the state still fixed to the blocking jig to be fitted to the shape measurement apparatus 251, a probe for a bevel top measurement is abutted on the bevel top of the lens to start the measurement. The measured value is inputted into the terminal computer 250 to be displayed on a display thereof.

(Bevel Edging Finishing Test)

The terminal computer 250 compares the design bevel top peripheral length and the measured value measured by the shape measurement apparatus 251, and when the difference between them is for example 0.1 mm or below, it is determined to be acceptable. Further, a comparison is made between a frame design size A and design size B, and a size A and size B measured by the shape measurement apparatus 251, respectively, and when the difference between them is for example 0.1 mm or below, it is determined to be acceptable. The quality of the bevel is examined by comparing the position and shape of the bevel of the lens before bevel edging with the bevel position in the drawing printed out in the processing instruction sheet prepared based on the above-described calculation result. Further, an appearance test is made to check whether or not damage, burr, crack, or the like is caused by the edging.

(Packing and Shipping)

The lens finished the bevel edging as described above is packed and shipped to a spectacle store 10.

Note that, in the present invention, when blocking, the blank is tilted based on the decentral amount to perform the block, however, it is alternatively possible to prevent the back cut using a controlling portion of a cutting machine without tilting the blank. Further, in the present embodiment, an example using both the semi-finished lens blank and lens blank is shown, however, it is also possible to use one of the both. Further, it is possible to decenter the optical center of the semi-finished lens from the geometric center thereof by a predetermined amount to process a non-designed optical surface. Note that the outer contour of the blank is defined to be almost circle here, however, the almost circle means a shape capable of specifying the geometric center of itself including an oval, a shape similar to an average frame shape, and so on, and is not limited to the circle.

INDUSTRIAL AVAILABILITY

The present invention is applicable to the case where a manufacturing side such as a lens maker manufactures a spectacle lens based on order information from an order-placement side such as a spectacle store to thereby supply to the order-placement side, in which, specifically, the lens supplied by the manufacturing side is completed an edging, or so forth.

BRIEF DESCRIPTION OF DRAWINGS

FIG. 3 is a view showing an example order entry screen of an ordering terminal;

EXPLANATION OF REFERENCES

Figure 1:
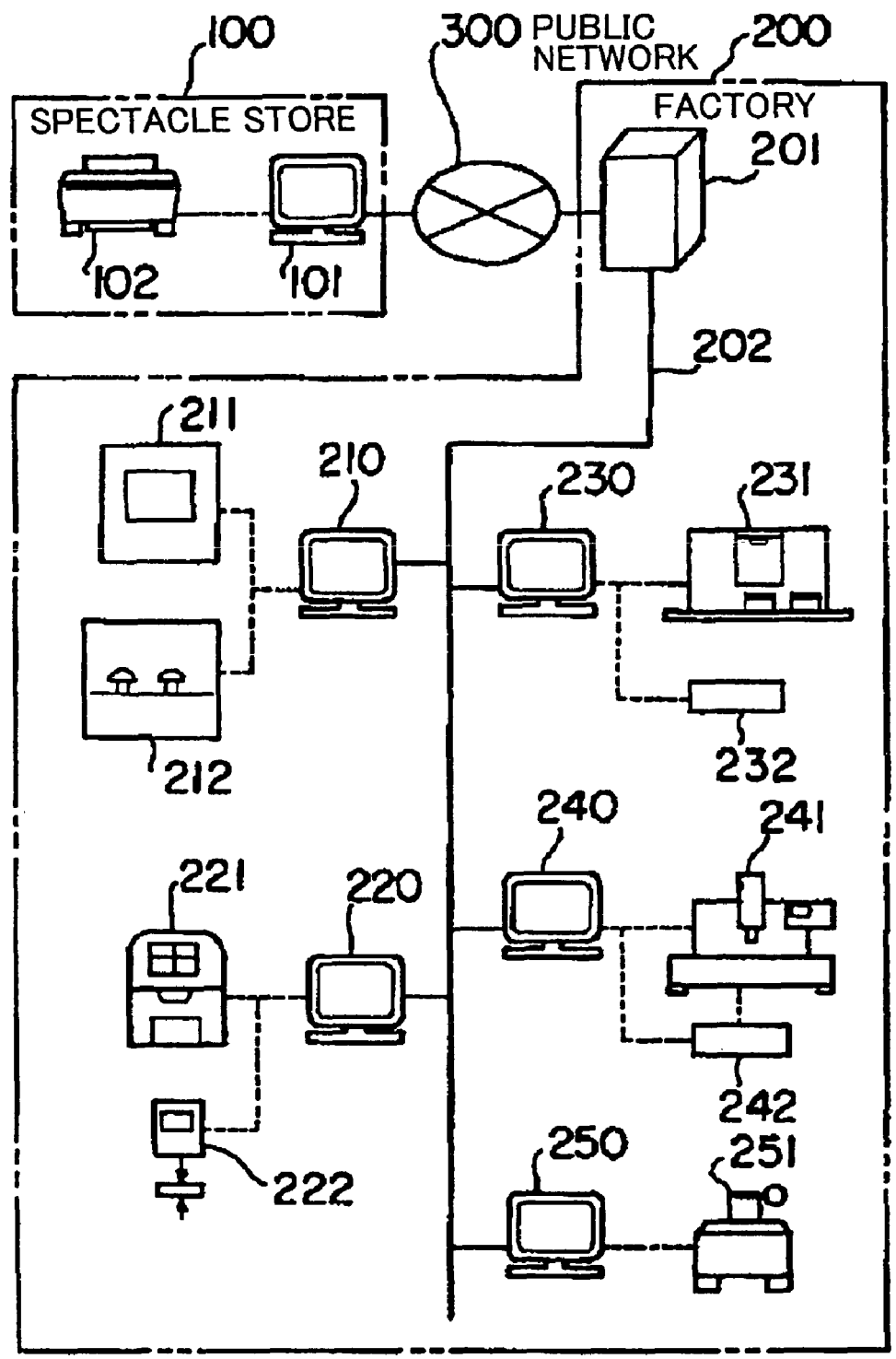
FIG. 1 is a view showing an entire configuration of a spectacle lens manufacturing system according to a present invention.
Figure 2:
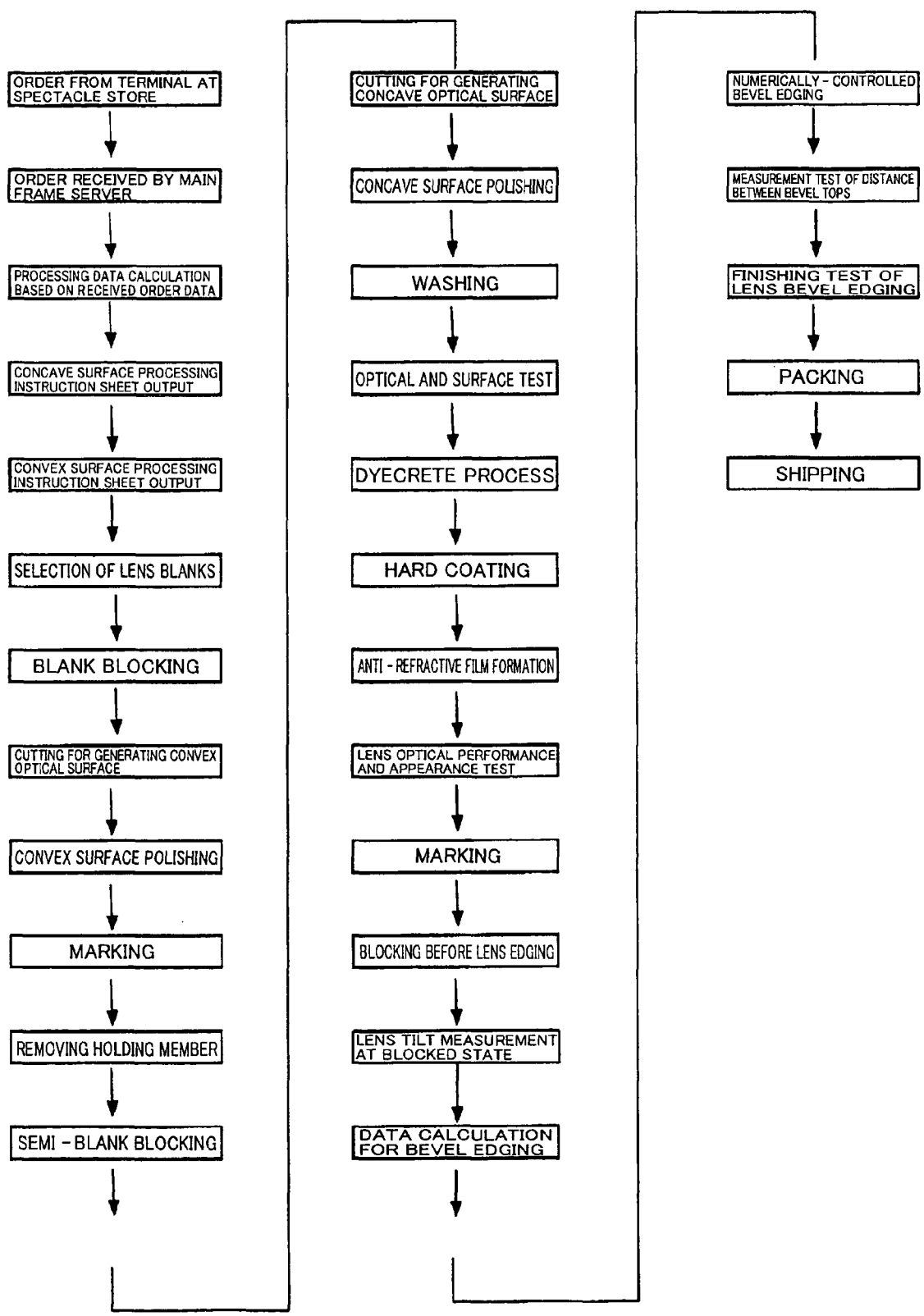
FIG. 2 is a flowchart illustrating the spectacle lens manufacturing system according to the present invention.
Figures 4, 5:
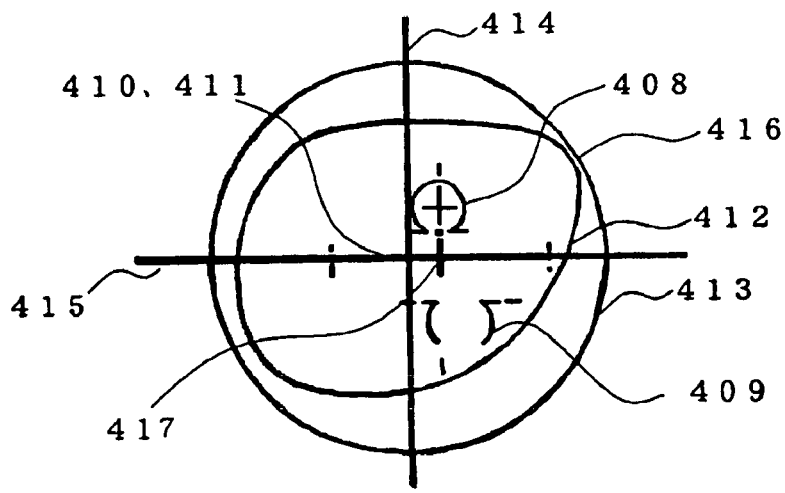
FIG. 4 is an explanation view explaining a calculation method of an outside diameter of a required blank.
FIG. 5 is a view showing example options of the outside diameter of the blank as a table.
Figure 6:
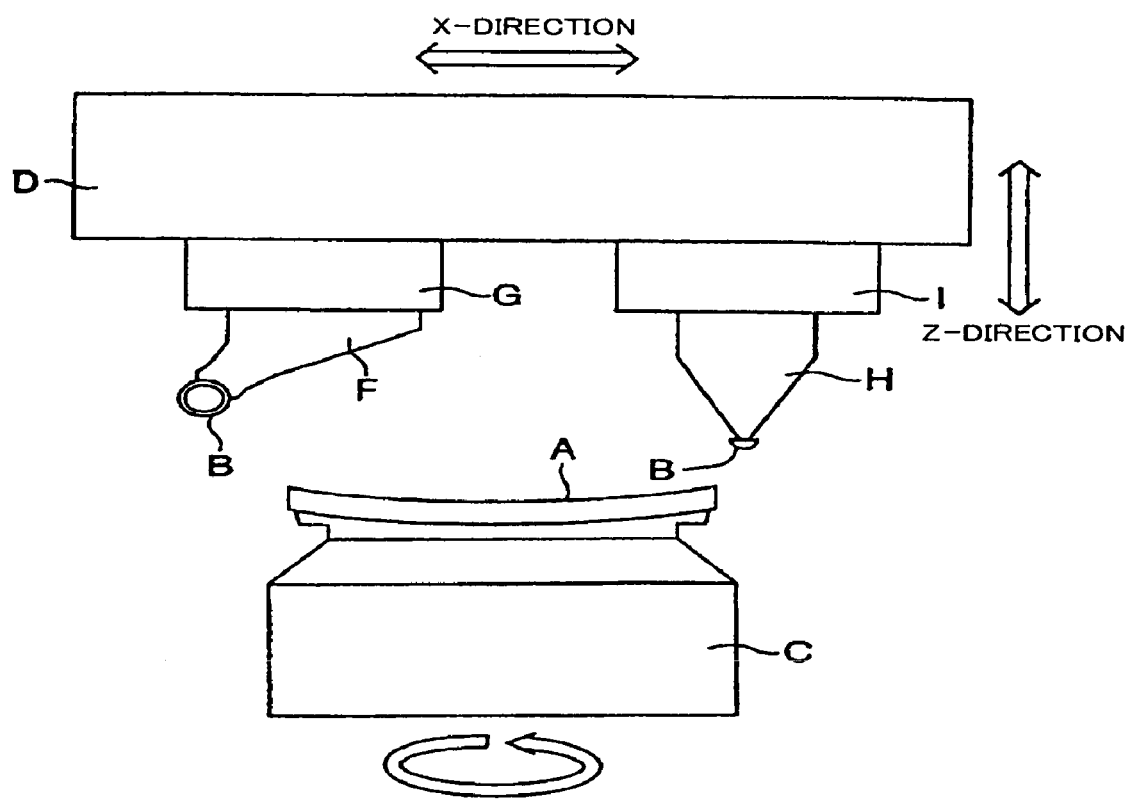
FIG. 6 is a view showing a schematic configuration of a curb generator.
Figure 7:
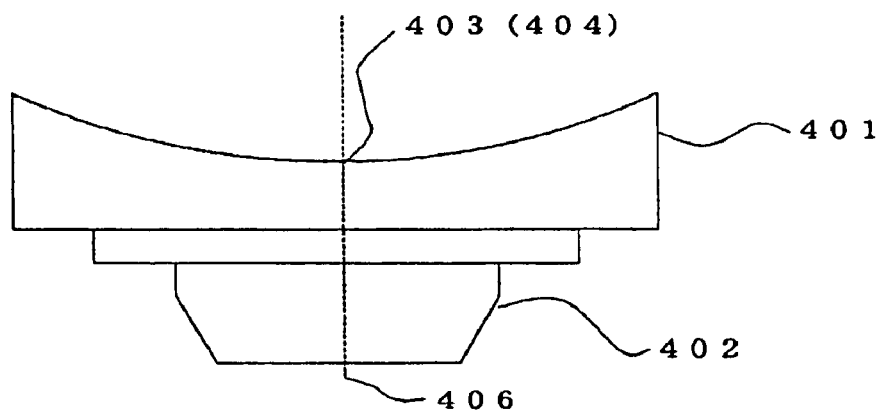
FIG. 7 is an explanation view showing a conventional blocking.
Figure 8:
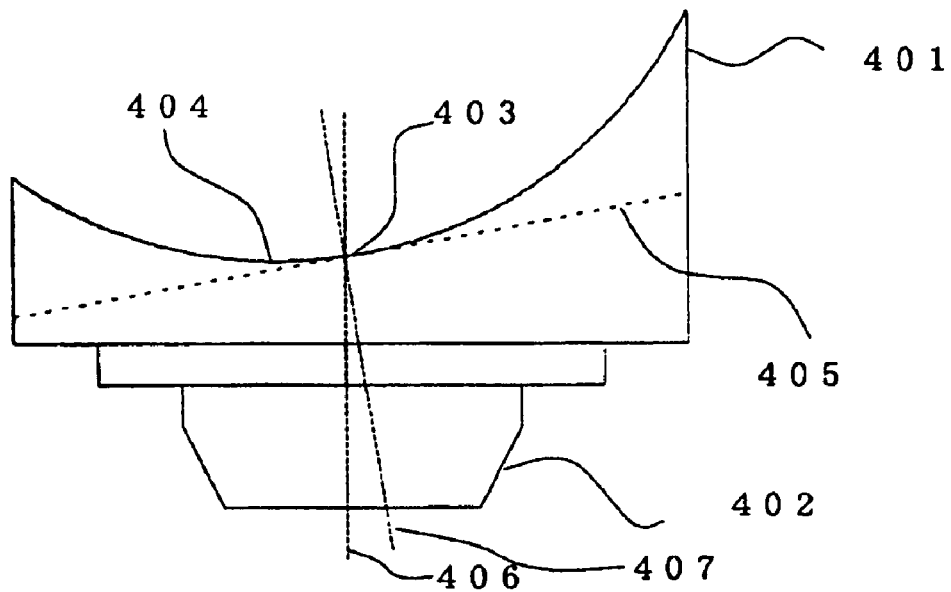
FIG. 8 is an explanation view showing the conventional blocking.
Figure 9:
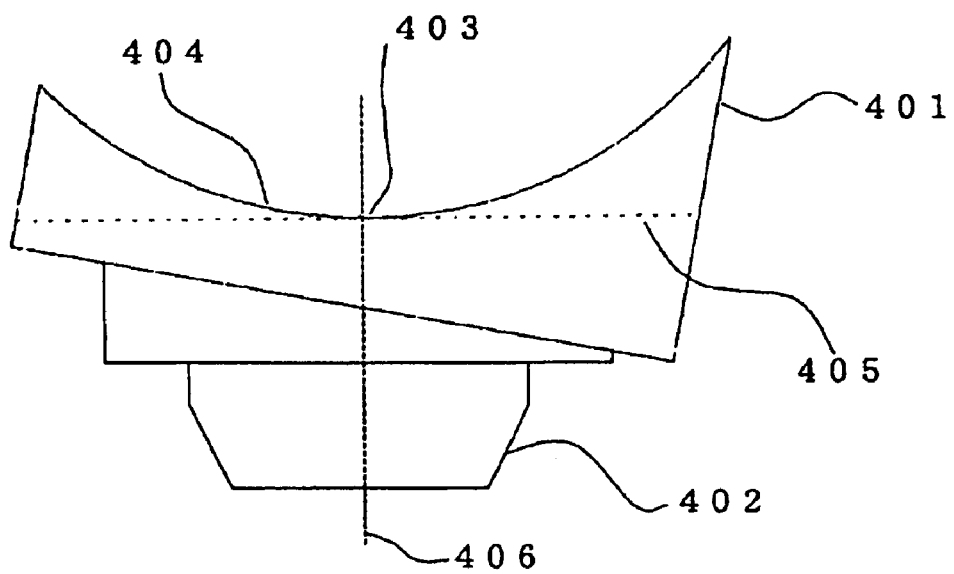
FIG. 9 is an explanation view showing a blocking according to the present invention.
Figure 10:
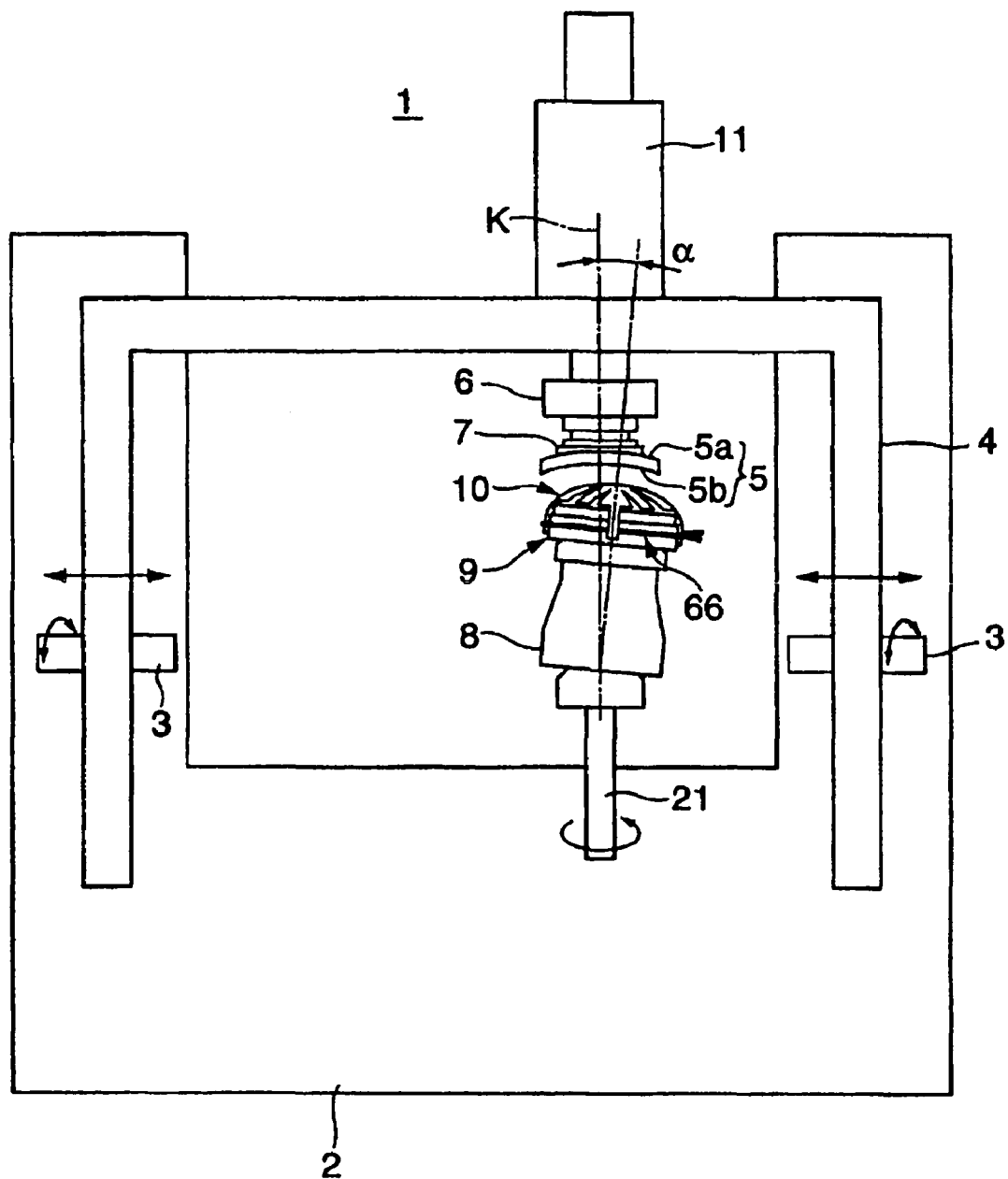
FIG. 10 is a view showing an entire configuration of a polishing device.
Figures 11, 12:
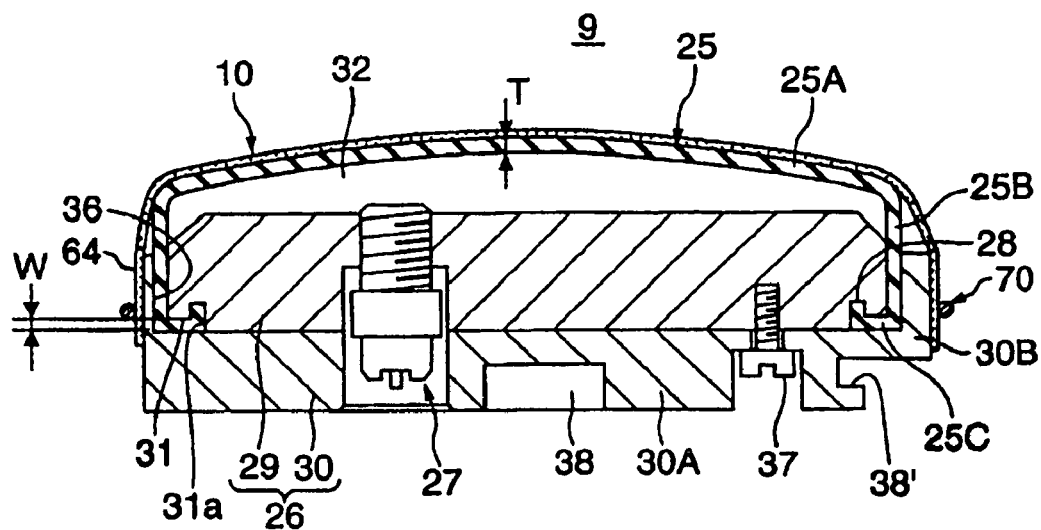
FIG. 11 is a view showing a polishing jig 9.
FIG. 12 is a view showing example options of the outside diameter of the blank.
Figure 13:
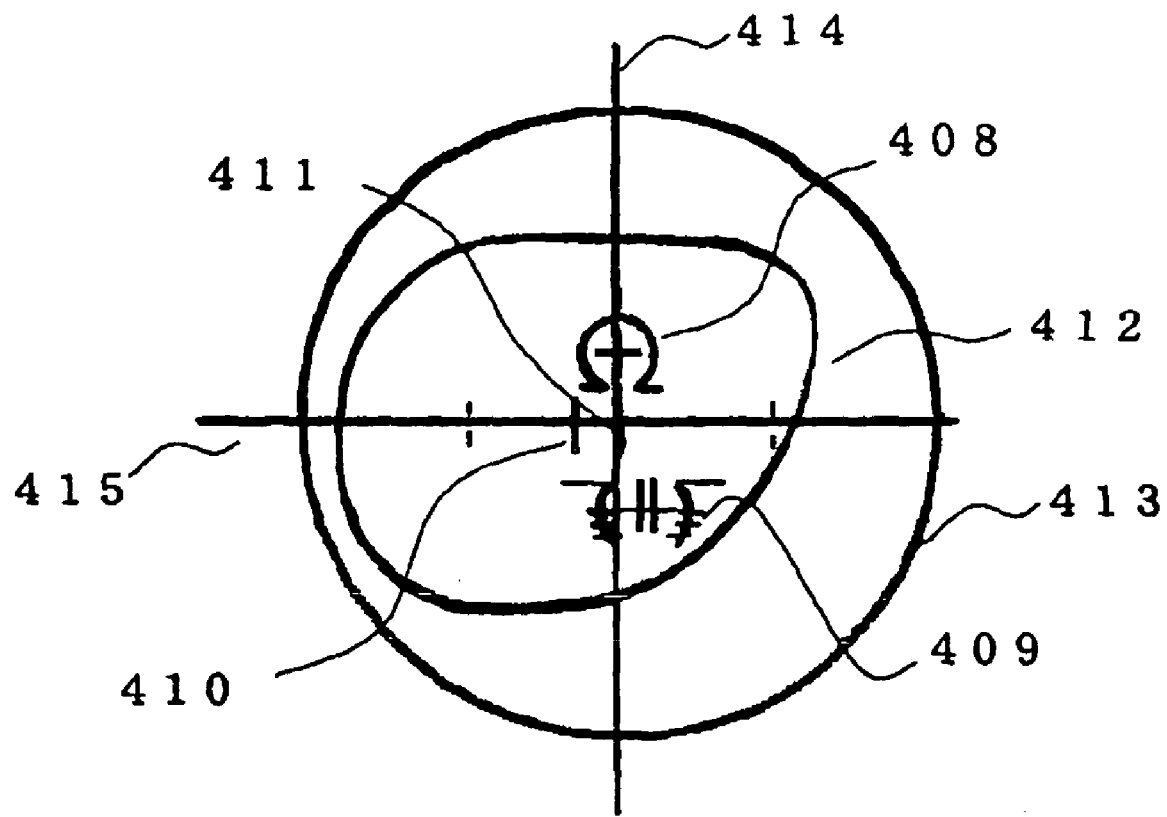
FIG. 13 is an explanation view showing a conventional calculation method of the outside diameter of the blank

1 . . . polishing device
2 . . . device main body
3 . . . arm
4 . . . lens
5a . . . convex surface
5b . . . concave surface
7 . . . lens holder
8 . . . swing device
9 . . . polishing jig
10 . . . polishing pad
25 . . . balloon member
25A . . . dome section
26 . . . fixing tool
27 . . . valve
32 . . . sealed space 100 spectacle store
101 terminal computer
102 frame shape measurement apparatus
200 factory
201 mainframe
202 LAN
210 terminal computer
211 rough edging machine (curve generator)
212 smoothing and polishing machine
220 terminal computer
221 lens meter
222 thickness meter
230 terminal computer
231 marker
232 image processor
240 terminal computer
242 chuck interlocker
250 terminal computer
251 shape measurement apparatus
300 public network
401 blank
402 fixture
403 geometric center on a surface to be processed
404 optical center on a surface to be processed or prism measurement center on a surface to be processed
405 tilt of geometric center on a surface to be processed
406 central axis of fixture and rotation axis of processing machine
407 axis indicating normal direction of geometric center of surface to be processed
408 distance vision refractive power measurement point
409 near vision refractive power measurement point
410 frame center
411 geometric center of blank
412 spectacle frame edge shape
413 blank
414 meridian passing through geometric center of blank
415 datum line
416 contact of frame edge shape and blank outermost peripheral edge
417 prism measurement point

The invention claimed is:

1. A method of manufacturing a spectacle lens to be set in one of two sub-frames of a spectacle frame, the method being based on order information including a prescription value, the method comprising:

a step of forming a lens member by obtaining a circular lens member by forming a circular plastic material into a curved surface shape of an optical surface satisfying an optical specification of the spectacle lens related to an order, the circular lens member being obtained before the lens member is processed into an edge shape, the circular plastic material being selected from a plurality of semi-finished lens blanks or lens blanks prepared in advance, each of the semi-finished lens blanks having a curved surface shape that is frequently ordered in a past actual order record and being used for forming the frequently ordered curved surface shape, each of the lens blanks being used for forming a curved surface shape that is ordered at low frequency in the past actual order record, wherein, in the lens member forming step, based on the order information including spectacle frame information and layout information, an optical center of the optical surface is set at a position having a distance away from a geometric center of the circular lens member, the distance corresponding to an inward eccentric quantity calculated based on a pupil distance PD and a distance between centers of the two sub-frames, a geometric center of the edge shape corresponding to an associated sub-frame center, the geometric center of the circular lens member corresponds to the associated sub-frame center and the geometric center of the edge shape, one surface of a selected semi-finished lens blank has not yet been processed into the curved surface shape satisfying the optical specification of the spectacle lens related to the order, but has been processed into a predetermined surface shape as the circular plastic material of a processing target, and both surfaces of a selected lens blank have not yet been processed into the curved surface shape satisfying the optical specification of the spectacle lens related to the order, but have been processed into the predetermined surface shape as the circular plastic material of the processing target, the lens member forming step uses a numerical-control curve generator generating the curved surface shape of the processing target by controlling distances from a cutting blade to the circular plastic material and a rotation axis, respectively, in accordance with the curved surface shape of a formation target while rotating the circular plastic material around the rotation axis passing through a specific point of the curved surface of the processing target, and the circular plastic material is arranged so that the center thereof being a geometric center of an edge shape of the spectacle lens comes above the rotation axis, a calculation is made to obtain a tilt angle in a case where a reference surface of the circular plastic material is tilted at a predetermined angle with respect to a case where the processing is performed on assumption that an optical center or a lens vertex positions above the rotation axis, and a processing is performed by tilting the reference surface of the circular plastic material beforehand to offset the tilted angle.

2. The method of claim 1, wherein the selected semi-finished lens blank or the selected lens blank has an outside diameter at least larger than a maximum distance between one of the sub-frame centers and the associated sub-frame of the spectacle frame related to the order and having the smallest outside diameter as well, the selected semi-finished lens blank or the selected lens blank being selected and processed so that the spectacle lens related to the order is manufactured.

3. The method of claim 1, wherein the circular plastic material is set in a processing machine so that a normal direction at a geometric center of a surface to be processed of the circular plastic material becomes in parallel with a rotational axis of the processing machine.

4. A spectacle lens manufacturing system, comprising:

an order placement-side computer configured to process a transmit information required to order a spectacle lens including frame shape information;

a manufacturing-side computer configured to acquire information required to manufacture the spectacle lens-related to the order by receiving the information transmitted by the order placement-side computer; and a spectacle lens manufacturing device configured to manufacture the spectacle lens-related to the order that is processed to have a shape settable in one of two sub-frames of a frame by performing processes including formations of a curved surface and edge shape on a circular plastic material based on the information acquired by the manufacturing-side computer, each sub-frame having a center, the circular plastic material being selected from a semi-finished lens blank or a lens blank, the semi-finished lens blank having a curved surface shape that is frequently ordered in a past actual order record and being used for forming the frequently ordered curved surface shape, the lens blank being used for forming a curved surface shape that is ordered at low frequency in the past actual order record;

wherein said spectacle lens manufacturing device selectively uses, as the circular plastic material of a processing target, the semi-finished lens blank of which one surface has not yet been processed or the lens blank of which both surfaces have not yet been processed to have a curved surface satisfying an ultimate optical specification but have a predetermined surface shape, wherein an area of the edge shape on a surface of the circular plastic material is determined prior to processing the unprocessed surface of semi-finished lens blank or both surfaces of the lens blank to be curved, so that a geometric center of the semi-finished lens blank or the lens blank does not match an optical center of the spectacle lens but matches with a geometric center of the edge shape to be processed and the center of one of the sub-frames, wherein an optical center of an optical surface of the spectacle lens is set at a position having a distance away from a geometric center of the spectacle lens before being processed into the edge shape, based on order information including spectacle frame information and layout information, wherein the distance away from the geometric center of the spectacle lens corresponds to an inward eccentric quantity calculated based on a pupil distance PD and a distance between the centers of the two sub-frames, the geometric center of the edge shape corresponding to the associated sub-frame center and the geometric center of the semi-finished lens blank or the lens blank, wherein said spectacle lens manufacturing device selects, out of a plurality of the semi-finished lens blank or the lens blank of different outside diameters and/or lens thicknesses prepared in advance, the semi-finished lens blank or the lens blank having the outside diameter and/or lens thickness size(s) allowing an appropriate processing for the spectacle lens-related to the order, wherein the selection of the outside diameter of the semi-finished lens blank or the lens blank is conducted by specifying based on a distance from one of the sub-frame centers to an associated sub-frame and the spectacle lens-related to the order is manufactured by processing the selected semi-finished lens blank or lens blank, and wherein the curved surface formation is performed to the unprocessed surface of the semi-finished lens blank or both of the surfaces of the lens blank selected by the selection, wherein a numerical-control curve generator generates the curved surface shape of a processing target by controlling distances from a cutting blade to the circular plastic material and a rotation axis, respectively, in accordance with the curved surface shape of a formation target while rotating the circular plastic material around the rotation axis passing through a specific point of the curved surface of the processing target, and wherein the circular plastic material is arranged so that the center thereof being a geometric center of an edge shape of the spectacle lens comes above the rotation axis, a calculation is made to obtain a tilt angle in a case where a reference surface of the circular plastic material is tilted at a predetermined angle with respect to a case where the processing is performed on assumption that an optical center or a lens vertex positions above the rotation axis, and a processing is performed by tilting the reference surface of the circular plastic material beforehand to offset the tilted angle.

5. The spectacle lens manufacturing system according to claim 4, wherein the circular plastic material is set in a processing machine so that a normal direction at a geometric center of a surface to be processed of the circular plastic material becomes in parallel with a rotational axis of the processing machine.

* * * * *